T. R. TIMBY.
Solar Time Globe.
No. 39,183. Patented July 7, 1863.
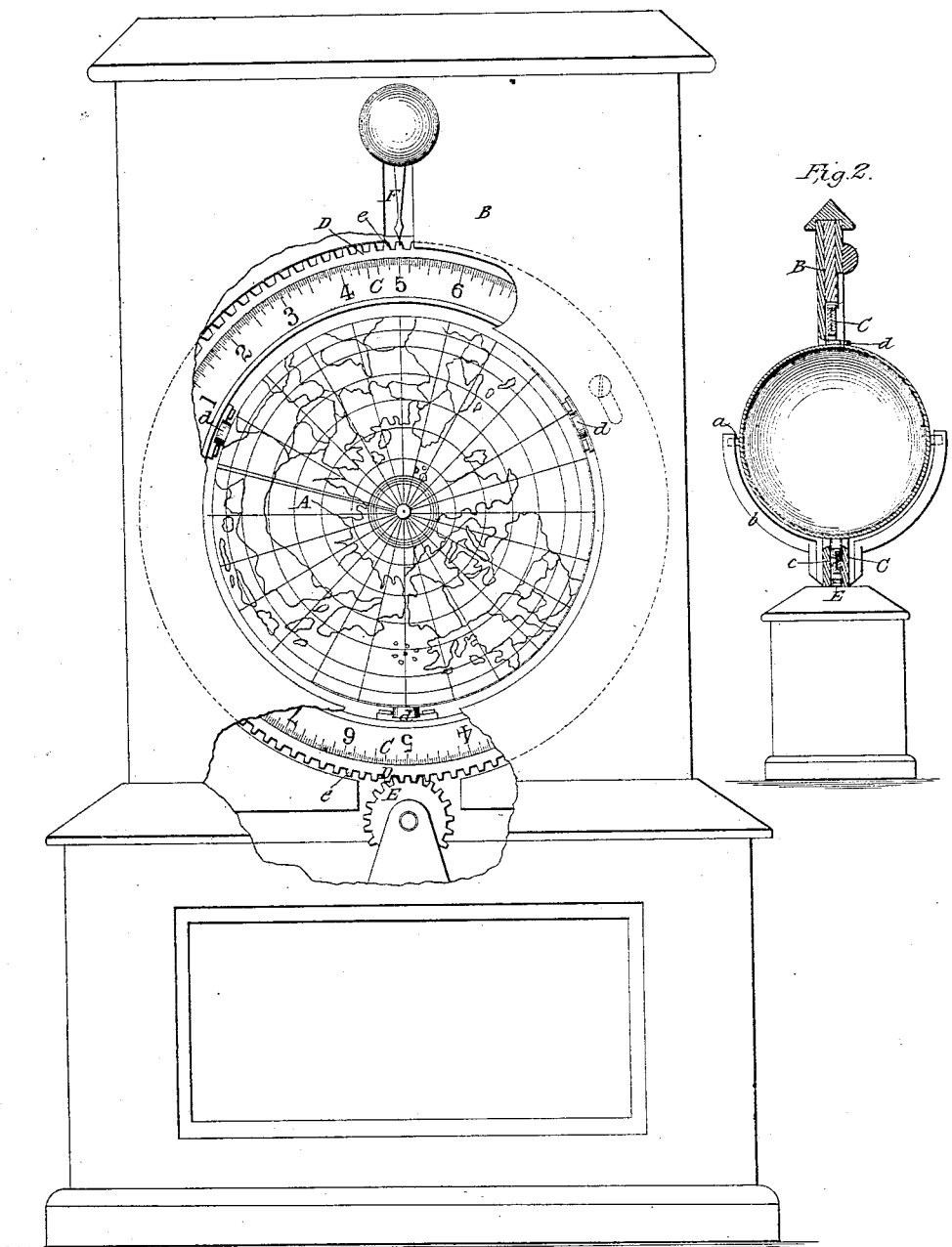

UNITED STATES PATENT OFFICE.

THEODORE R. TIMBY, OF SARATOGA SPRINGS, NEW YORK.

IMPROVEMENT IN SOLAR TIME-GLOBES.

Specification forming part of Letters Patent No. 39,183, dated July 7, 1863.

*To all whom it may concern:*

Be it known that I, THEODORE R. TIMBY, of Saratoga Springs, in the county of Saratoga and State of New York, have invented a new and Improved Solar Time-Globe; and I do hereby declare that the following is a full, clear, and exact description of the same, reference being had to the accompanying drawings, forming part of this specification, in which—

Figure 1 represents a front elevation of my invention, partly in section. Fig. 2 is a transverse vertical section of the same on a smaller scale than the previous figure.

Similar letters of reference indicate corresponding parts in the two figures.

The object of this invention is to arrange a terrestrial globe in such relation to a dial-plate and index that the culminating time of the sun, and consequently the true solar time, and also the clock or mean time, can be observed simultaneously at any moment.

The invention consists in the arrangement of a terrestrial globe on a horizontal axis, in combination with a revolving annular dial encircling the globe and adjustable by means of set-screws, and with a stationary index or pointer, in such a manner that by the index the culminating time of the sun on any part of the globe can be observed, and at the same time the clock or mean time can be read off for a certain location for which the dial has been adjusted.

To enable others skilled in the art to make and use my invention, I will proceed to describe it.

A represents a terrestrial globe, the axle $a$ of which is brought in a horizontal position, having its bearings in segmental arms $b$, which are secured to the case B, in which the globe revolves.

C is an annular dial-plate, which is divided off into twenty-four parts to correspond to the twenty-four hours of the day, and each part is subdivided into thirty or sixty parts to indicate the minutes. The dial-plate is secured to a ring, D, by means of set-screws $c$, which pass through slots in the ring in such a manner that the dial can be adjusted in either direction. The ring D is secured to the globe by means of clamps $d$, which are so arranged that the globe can be readily shifted in the ring and brought in the desired relation toward the dial. The edge of the ring is provided with cogs $e$, which gear into a cog-wheel, E, to which a rotary motion is imparted by a clock-movement or in any other desirable manner. The motion of this cog-wheel is so regulated that the ring D and with it the globe A revolve once in twenty-four hours.

F is an index or pointer, which is firmly secured to the case B, and which points to the marks on the dial and to the various meridians marked on the globe as the same revolve under it.

The operation is as follows: As the globe revolves, the several meridians marked on the same pass through under the index F, and the time when the sun culminates on any part of the globe can thus be observed at a glance. At the same time the dial is adjusted to correspond to the clock-time of a certain location on the globe—for instance, to that of Washington—by bringing the meridian of Washington in line with one of the figures, 12, on the dial. In this position the ring D is secured to the globe, and the globe is adjusted so that when the sun culminates the index stands exactly opposite to the figure 12 and to the meridian. If left thus both the dial and the globe will indicate the solar time, but in order to obtain the clock or mean time the dial is adjusted backward or forward by means of the set-screws $c$, according to the equation of time or any day of the year, and when this is accomplished the solar time and mean time can be read off simultaneously. Furthermore, the observer is enabled to tell instantaneously the difference of time between certain localities—for instance, when the globe and dial are adjusted for Washington and the index points at five it shows that it is five o'clock in Washington. At the same moment the sun culminates in all localities situated under the upper half of the meridian opposite to the index at that moment, and it is midnight on all localities under the lower half of said meridian, showing that there is a difference of time of five or seven hours between all localities under said meridian and the localities under the meridian of Washington.

This time globe is very simple in its construction, nothing being required but an ordinary clock-movement, the wheel E, the toothed ring D, with the adjustable dial, and the globe and index to make up the whole mechanism, and it will not only be an ornament for any room, but it will also be convenient to illustrate the difference of time on different localities of the globe, and the difference between solar and mean time.

What I claim as new, and desire to secure by Letters Patent, is—

The arrangement of the tooth-ring D and adjustable dial C, revolving once in twenty-four hours, in combination with the globe A secured to the revolving ring and adjustable in the same, and with the stationary index F, all constructed and operating in the manner and for the purpose substantially as shown and described.

THEORDORE R. TIMBY.

Witnesses:
   E. COWEN,
   D. S. COPELAND.